June 4, 1929.  W. S. VROOMAN  1,715,525

FLOOR COVERING FOR AUTOMOBILES AND THE LIKE

Filed May 13, 1927

INVENTOR.
William S. Vrooman
BY
Fay, Oberlin & Fay
ATTORNEYS

Patented June 4, 1929.

1,715,525

UNITED STATES PATENT OFFICE.

WILLIAM S. VROOMAN, OF CLEVELAND, OHIO, ASSIGNOR TO THE PAINE AND WILLIAMS COMPANY, OF CLEVELAND, OHIO, A CORPORATION OF OHIO.

FLOOR COVERING FOR AUTOMOBILES AND THE LIKE.

Application filed May 13, 1927. Serial No. 191,067.

Where ordinary rubber matting is used as a floor covering, and especially in automobiles, its great dissimilarity from carpeting, as regards appearance and tread has been so objectionable as to sharply limit extension of its use. On the other hand, carpeting, while affording a more desirable tread, is open to serious difficulties for automobile usage, since it wears too rapidly and unevenly, and is too retentive of dirt. A construction which will avoid the disadvantages of the old type rubber matting and the disadvantages of carpet, and at the same time maintain well-fitting edges is accordingly highly desirable.

To the accomplishment of the foregoing and related ends, the invention, then, consists of the features hereinafter fully described, and particularly pointed out in the claim, the following description and the annexed drawing setting forth in detail illustratively but one of the various ways in which the principle of the invention may be employed.

In said annexed drawing:—

Figure 1:
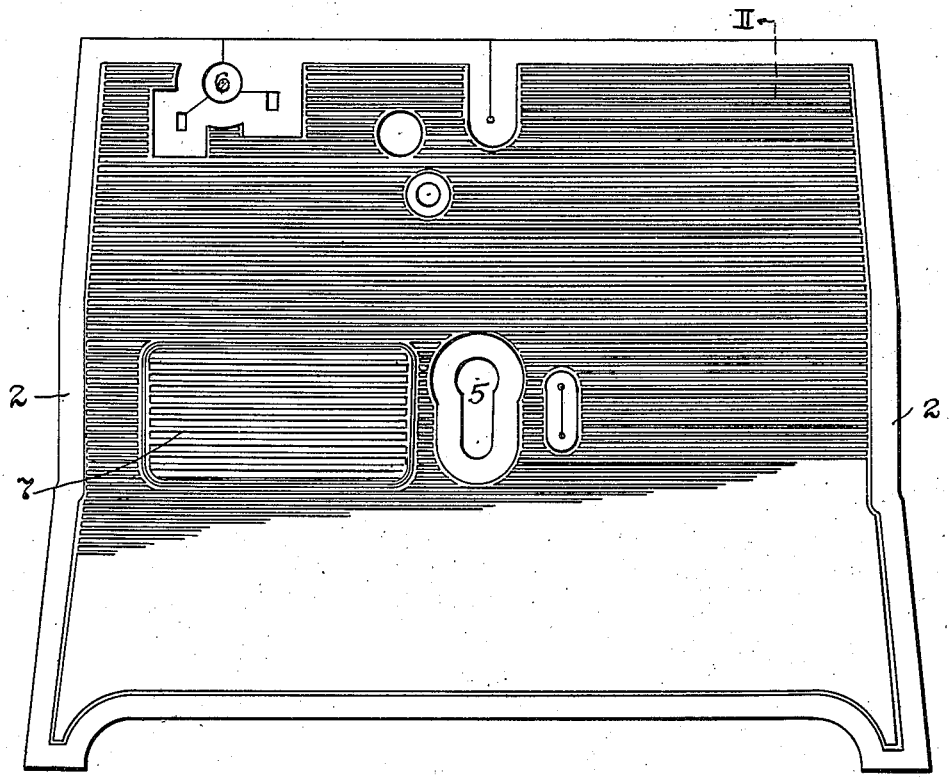
Figure 2:
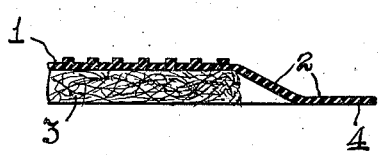

Fig. 1 is a plan view of an embodiment of my invention as adapted for an automobile; and Fig. 2 is a detail section taken on a plane indicated by the line II—II, Fig. 1.

Referring more particularly to the drawing, the reference numeral 1 designates a layer of soft vulcanized rubber presenting an upper or wearing surface. Ornamental figuring or designs of any preferred character may be molded in as desired, and usually a border effect 2 is advantageous, especially in the case of automobile mats.

Backing the rubber layer and secured thereto a fibrous padding 3 of felted character, providing a resilient foundation for the rubber layer, the thickness being such as to impart a soft yielding tread. An advantageous material for such backing or body layer is a hair-felt of a rather coarse type, such for instance as cattle-hair. The padding layer is cemented or vulcanized to the rubber layer and is cut to a smaller dimension than the rubber layer so as to leave a free margin 4 of rubber extending beyond the backing. The rubber margin thus tends to lie snugly against the floor. In the case of automomile mats, openings 5, 6, etc., for the gearshift lever, steering column, etc., may be provided, and these also may have a marginal finish or border like the outside border 2. An extra reenforced thickness of rubber surfacing 7 may be arranged if desired at the point where heel wear is especially prone to occur.

Other modes of applying the principle of the invention may be employed, change being made as regards the details disclosed, provided the means stated in the following claim or the equivalent of such, be employed.

I therefore particularly point out and distinctly claim as my invention:—

A covering for floors and the like comprising a resilient, fibrous base and an upper wearing layer of rubber, said upper layer extending beyond said base as a free, flexible margin.

Signed by me, this 7th day of May, 1927.

WILLIAM S. VROOMAN.